United States Patent
Choi et al.

(10) Patent No.: US 9,262,790 B2
(45) Date of Patent: Feb. 16, 2016

(54) SYSTEM AND METHOD FOR DETERMINING RANKING OF KEYWORDS FOR EACH USER GROUP

(75) Inventors: Jae Keol Choi, Seongnam-si (KR); Yu Won Kim, Seongnam-si (KR); Yeun Ha Park, Seongnam-si (KR); Hae-Young Kim, Seongnam-si (KR); Dong Hyun Ban, Seongnam-si (KR)

(73) Assignee: NHN Corporation, Seongnam-si (KR)

( * ) Notice: Subject to any disclaimer, the term of this patent is extended or adjusted under 35 U.S.C. 154(b) by 194 days.

(21) Appl. No.: 13/337,741

(22) Filed: Dec. 27, 2011

(65) Prior Publication Data

US 2012/0173542 A1     Jul. 5, 2012

(30) Foreign Application Priority Data

Dec. 30, 2010 (KR) ........................ 10-2010-0138879

(51) Int. Cl.
*G06F 17/30* (2006.01)
*G06Q 50/00* (2012.01)

(52) U.S. Cl.
CPC .......... *G06Q 50/01* (2013.01); *G06F 17/30707* (2013.01)

(58) Field of Classification Search
CPC .......... G06F 17/3089; G06F 17/30713; G06F 17/30867; G06F 17/30707; G06F 17/3053; G06F 17/30598; G06F 17/30719; G06Q 50/01
USPC .................... 707/748, 736, E17.008, 999.001
See application file for complete search history.

(56) References Cited

U.S. PATENT DOCUMENTS

| | | | |
|---|---|---|---|
| 5,864,848 A * | 1/1999 | Horvitz et al. | |
| 6,493,703 B1 * | 12/2002 | Knight et al. | |
| 7,028,026 B1 * | 4/2006 | Yang et al. | |
| 7,689,585 B2 | 3/2010 | Zeng et al. | |

(Continued)

FOREIGN PATENT DOCUMENTS

| KR | 10-0785754 | 12/2007 |
|---|---|---|
| KR | 10-2009-0013367 | 2/2009 |
| KR | 10-0892263 | 4/2009 |

OTHER PUBLICATIONS

Jun-Hui Her, et al., An Automatic Classification of Korean Documents Using Weight for Keywords of Document and Corpus: Bayesian classifier, Journal of KIISE, vol. 26. No. 2, p. 154-156, 1999.

(Continued)

*Primary Examiner* — Shiow-Jy Fan
(74) *Attorney, Agent, or Firm* — Greer, Burns & Crain, Ltd.

(57) ABSTRACT

Provided are a system and method for determining rankings of keywords according to a user group. The keyword ranking determining system includes a data grouping unit to group data of a weblog according to a predetermined theme, a weight application unit to calculate a document concentration that denotes a concentration degree, with respect to the theme, of a document corresponding to the data grouped according to the theme and to apply a weight corresponding to the document concentration to the data, a data set generation unit to generate at least one data set by grouping the data applied with the weight according to a search intention and a ranking determination unit to determine rankings of the at least one data set according to the theme, and a main keyword determination unit to determine a main keyword representing each of the at least one data set.

13 Claims, 4 Drawing Sheets

(56) References Cited

U.S. PATENT DOCUMENTS

| | | | |
|---|---|---|---|
| 7,765,209 B1* | 7/2010 | Khesin et al. | 707/736 |
| 8,290,926 B2* | 10/2012 | Ozzie et al. | 707/708 |
| 2002/0035619 A1* | 3/2002 | Dougherty et al. | 709/219 |
| 2002/0142277 A1* | 10/2002 | Burstein et al. | 434/335 |
| 2005/0055341 A1* | 3/2005 | Haahr et al. | 707/3 |
| 2006/0218153 A1* | 9/2006 | Voon et al. | 707/10 |
| 2006/0265362 A1* | 11/2006 | Bradford | 707/3 |
| 2006/0282303 A1* | 12/2006 | Hale et al. | 705/10 |
| 2007/0038646 A1* | 2/2007 | Thota | 707/100 |
| 2007/0198459 A1* | 8/2007 | Boone et al. | 707/1 |
| 2007/0271146 A1* | 11/2007 | Nordmark et al. | 705/26 |
| 2008/0282186 A1* | 11/2008 | Basavaraju | 715/781 |
| 2010/0023311 A1* | 1/2010 | Subrahmanian et al. | 704/2 |
| 2010/0131455 A1* | 5/2010 | Logan et al. | 707/602 |
| 2010/0153324 A1* | 6/2010 | Downs et al. | 706/21 |

OTHER PUBLICATIONS

Ki-Youn Sung, Bo-Hyun Yun, "Topic based Web Document Clustering using Named Entities", Journal of the Korean Contents Association, vol. 10, No. 5, p. 29-36, May 2010.

* cited by examiner

SYSTEM AND METHOD FOR DETERMINING RANKING OF KEYWORDS FOR EACH USER GROUP

CROSS-REFERENCE TO RELATED APPLICATION

This application claims priority from and the benefit of Korean Patent Application No. 10-2010-0138879, filed on Dec. 30, 2010, which is hereby incorporated by reference for all purposes as if fully set forth herein.

BACKGROUND OF THE INVENTION

Field of the Invention

Exemplary embodiments of the present invention relate to a system and method for determining rankings of keywords for each user group.

DISCUSSION OF THE BACKGROUND

A conventional method of providing popular keywords provides keywords that have increased in popularity in overall fields rapidly, such as real-time popular keywords, daily fast rising keywords, and weekly fast rising keywords. However, the conventional method provides keywords to all general users. That is, the keywords being provided are not classified according to theme, gender, age, and the like.

Accordingly, a system and method to efficiently provide keyword rankings according to a user group will be suggested in the following description.

The above information disclosed in this Background section is only for enhancement of understanding of the background of the invention and therefore it may contain information that does not form any part of the prior art nor what the prior art may suggest to a person of ordinary skill in the art.

SUMMARY OF THE INVENTION

Exemplary embodiments of the present invention provide a system and method for determining rankings of keywords, which provide new information by providing keyword rankings according to a user group and induce a new query count.

Exemplary embodiments of the present invention also provide a system and method that display keywords having the same search intention as one data set and provide a search share and a main keyword of the data set by calculating the search share and determining rankings, to thereby provide new information and attract interest from users.

Additional features of the invention will be set forth in the description which follows, and in part will be apparent from the description, or may be learned by practice of the invention.

An exemplary embodiment of the present invention discloses a keyword ranking determining system including a data grouping unit to group data of a weblog according to a predetermined theme, a weight application unit to calculate a document concentration that denotes a concentration degree, with respect to the theme, of a document corresponding to the data grouped according to the theme and to apply a weight corresponding to the document concentration to the data, a ranking determination unit to generate at least one data set by grouping the data applied with the weight according to a search intention and to determine rankings of the at least one data set according to the theme, and a main keyword determination unit to determine a main keyword representing each of the at least one data set.

An exemplary embodiment of the present invention also discloses a keyword ranking determining method including grouping data of a weblog according to a predetermined theme, calculating a document concentration that denotes a concentration degree, with respect to the theme, of a document corresponding to the data grouped according to the theme and applying a weight corresponding to the document concentration to the data, generating at least one data set by grouping the data applied with the weight according to a search intention, and determining rankings of the at least one data set according to the theme, and determining a main keyword representing each of the at least one data set.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. Like reference numerals in the drawings denote like elements.

It will be understood that when an element is referred to as being "on" or "connected to" another element, it can be directly on or directly connected to the other element, or intervening elements may be present. In contrast, when an element is referred to as being "directly on" or "directly connected to" another element, there are no intervening elements present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 1:
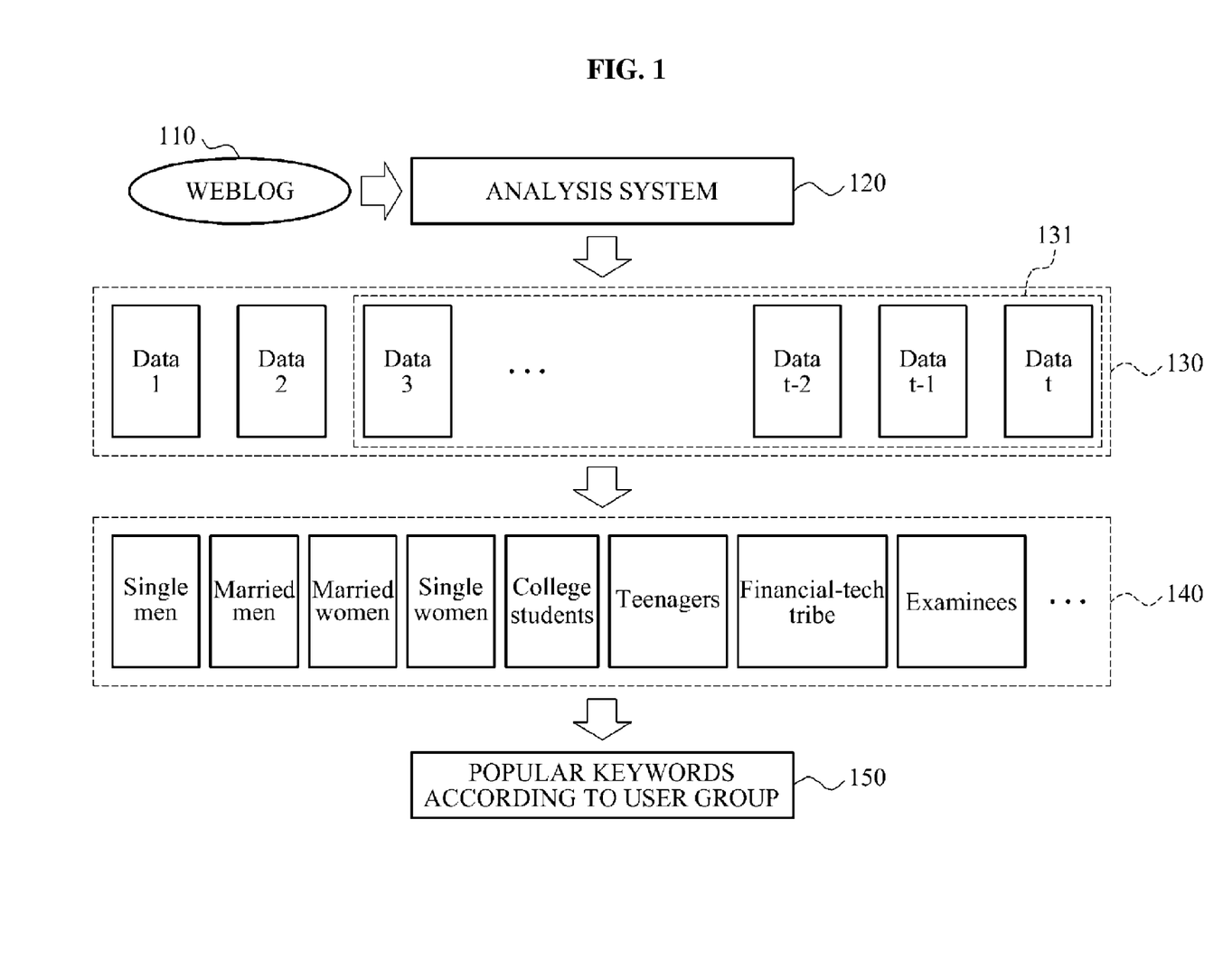
FIG. 1 is a diagram illustrating an overall structure configured to provide keywords per user group, according to an exemplary embodiment of the present invention.

FIG. 1 is a diagram illustrating an overall structure configured to provide keywords per user group, according to an exemplary embodiment of the present invention.

When a document displayed to a user through a site is selected by the user, a weblog 110 may include at least one selected from information on a keyword by which the user accessed the document, information on the user, and information on the selected document. For example, the weblog 110 may record information on a number of visitors to a particular site, a visit type, a number of visits of each webpage, visiting time, and the like.

Here, the term "site" may refer to all types of websites provided to users through a wired or wireless network, including a single webpage constituting a website. The "user" may be identified through at least one of a user identifier (ID), a user terminal ID, and a cookie ID corresponding to a cookie related to a web browser of a terminal.

The term "display" may be interpreted as contents such as text, images, video, and hyperlinks which are related to a corresponding document are provided to a user visiting a corresponding site. In addition, the term "select" with respect to the displayed document may be interpreted as the user visiting the site makes a reaction, for example, a mouse click with respect to the provided contents such as the text, images, and the like.

An analysis system 120 may parse a log in real time at a predetermined time interval, for example every minute, using the weblog 110, thereby generating at least one data every predetermined time interval. Here, the analysis system 120 may be included in or operated in association with the keyword ranking determining system according to the exemplary embodiments of the present invention.

A first dotted-line box 130 refers to a plurality of data generated through the analysis system 120. A second dotted-line box 131 refers to a sliding window. The sliding window may be used to select data only generated within a predetermined recent period. For example, when a size of the sliding window is set to 40 minutes, data generated within the most recent 40 minutes may be selected for use. Here, the "data" generated by the weblog 110 may include information on a particular keyword and a particular document with respect to at least one selection of the particular document using the particular keyword.

The selected data may be grouped according to a theme and applied with a weight. A third dotted-line box 140 shows an example of the theme. That is, the third dotted-line box 140 shows the selected data grouped according to a user group. Although 8 groups are shown as the user groups in FIG. 1, the themes for grouping the selected data are not limited to the 8 groups. In this example, groups may be added or replaced as necessary. For example, "male college students" and "female college students" may be used instead of "college students." Also, groups may be stratified such as in "male college students>sport mania" or "single women>cultural tribe." Furthermore, the themes may group data using another reference rather than the user group. In the following description, the keyword ranking determining system and method according to the exemplary embodiments will be described while making reference to the case of using 8 user groups as shown in FIG. 1.

The data grouped according to the user groups may be further grouped according to a search intention, thereby forming data sets. The data sets may be ranked according to a share. For example, with respect to a user group "single men", a data set including keywords 'Korando', 'Korando price', and 'Ssangyong motor' ranks first, occupying a share of 16.34% while is a data set including keywords 'KimGeurim', 'Super star K2' and 'Super star swearword' ranks second, occupying a share of 11.22%.

Here, grouping of the data according to the user group, calculation of the shares, determination of keyword rankings according to the share may be performed by the foregoing keyword ranking determining system.

Figure 2:
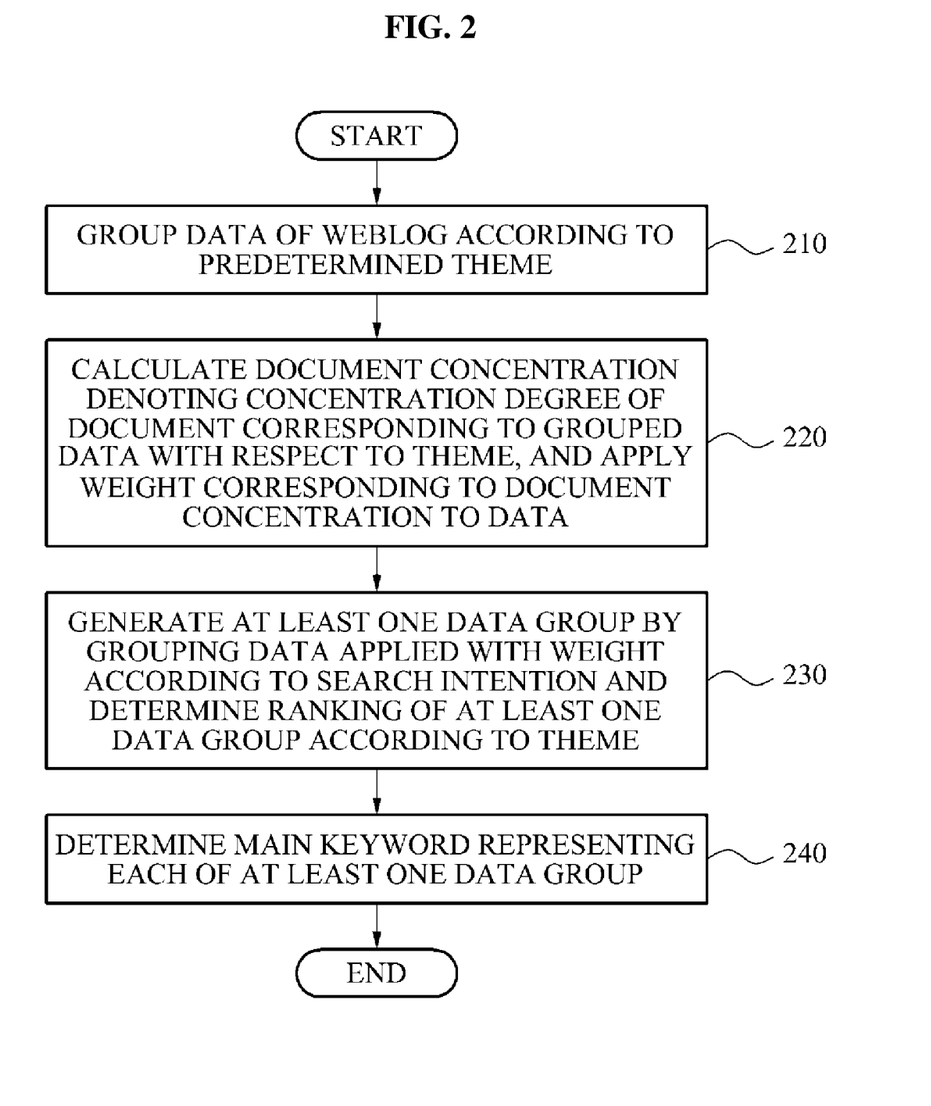
FIG. 2 is a flowchart illustrating a keyword ranking determining method according to an exemplary embodiment of the present invention.

FIG. 2 is a flowchart illustrating a keyword ranking determining method according to an exemplary embodiment of the present invention. The keyword ranking determining method may be performed by the keyword ranking determining system described with reference to FIG. 1.

In operation 210, the keyword ranking determining system may group data of a weblog according to a predetermined theme. The weblog may be the weblog 110 described with reference to FIG. 1. The data of the weblog may include information on at least two of a document, a keyword used in selecting the document, and a selection number denoting the number of selections by which the document is selected using the keyword. For example, grouping the data of a weblog by predetermined themes may include grouping the data according to user groups while the user groups may be determined by grouping users through a B-cookie (browser-cookie). As aforementioned, the themes may be not only the user group but also other references determined by an operator.

In operation 220, the keyword ranking determining system may calculate a document concentration denoting a degree of concentration with respect to the theme, of a document corresponding to the data grouped according to the theme. Also, the keyword ranking determining system may apply a weight corresponding to the document concentration to the data. Keywords and documents of the grouped data may not represent characteristics of only the corresponding group. For example, a keyword "car" may be included in data grouped by a user group "single men" and also included in data grouped by a user group "married men." That is, through only the selection number, for example a number of clicks, generated using the corresponding keyword, it is difficult to conclude that the keyword "car" represents characteristics of one particular user group. Also, through only a certain document "A" and the selection number generated with respect to the document A, it is difficult to conclude that the document A represents characteristics of one particular user group. Therefore, as in operation 220, the keyword ranking determining system may calculate the document concentration denoting the degree of concentration with respect to the theme of the document and apply a weight corresponding to the document concentration to the data, so that data including a document having a relatively high document concentration with respect to the theme may have more influence on calculation of the share afterward. Also, in other words, data including a document having a relatively low document concentration with respect to the theme may have less influence on calculation of the share.

For this purpose, the keyword ranking determining system may calculate the document concentration of each document using a probability that the document corresponds to the theme and probabilities that the document corresponds to all themes, and may adjust the selection number with respect to the document by applying the document concentration as the to weight.

Specifically, presuming that 'd' denotes a document, 'T' denotes a set of all themes, 't' ($\in T$) denotes each theme included in the set of themes, and '$P_d(t)$' denotes a probability that the document 'd' corresponds to the theme 't', a document concentration '$Q_d(t)$' of the document 'd' with respect to the theme 't' may be calculated by Equation 1.

$$Q_d(t) = \frac{P_d(t)}{\sum_{k \in T} P_d(k)} \qquad \text{[Equation 1]}$$

Here, presuming that '$C_{d,t\text{-}naive}$' denotes a selection number, for example a number of clicks, occurring with respect to the document 'd' in the theme 't', a finally adjusted selection number '$C_{d,t\text{-}weighted}$' may be calculated by Equation 2.

$$C_{d,t\text{-}weighted} = C_{d,t\text{-}naive} \times Q_d(t)^{1+\theta} \qquad \text{[Equation 2]}$$

Here, an application degree of the document concentration as the weight may be adjusted by 'θ.' Here, 'θ' may be a predetermined real number.

In operation 230, the keyword ranking determining system may generate at least one data set by grouping the data to which the weight is applied according to a search intention, and determine rankings of the at least one data set according to the theme.

Basically, the data having the same 'search intention' may be grouped as one data set and, for this purpose, principles (1) and (2) may be defined as follows.

(1) When Clicked documents are the same document, it is determined that the search intention is the same although different keywords are used.

(2) Although clicked documents are different, it is determined that the search intention is the same when the same or similar keywords are used.

Using the above-mentioned principles, the keyword ranking determining system may generate the data set, by grouping the data including information on the same document as the same search intention and by grouping the data including keywords among which similarity is greater than or equal to a predetermined value as the same search intention. According to other exemplary embodiments, the keyword ranking determining system may cluster documents using similarity among keywords used in selecting the corresponding document and thereby generate the at least one data set, each including the same document.

After the at least one data set is thus generated by grouping data having the same search intention as one data set, the size of the at least one data set may be calculated using a sum of the selection number adjusted with respect to the data included in the data set. In addition, the share may be calculated as a ratio of the size of the at least one data set. That is, the keyword ranking determining system may calculate the share of each data set included in the theme, using the selection number adjusted according to the document, and determine rankings of the at least one data set in the theme. The share may show shares of clicks generated in each user group by each search intention. Presuming that 'N(c)' denotes a sum of the selection numbers in a data set 'c' (∈C) with respect to an entire data set 'C', a share 'P(c)' of the data set 'c' may be calculated using Equation 3.

$$P(c) = \frac{N(c)}{\sum_{k \in C} N(k)} \qquad \text{[Equation 3]}$$

In operation 240, the keyword ranking determining system may determine a main keyword representing each data set. To be specific, each data set includes a plurality of data.

Accordingly, each data set may include various keywords having the same search intention. Therefore, the keyword ranking determining system may determine a keyword most properly representing each data set as the main keyword.

For example, the keyword ranking determining system may determine the main is keyword using conditions (a), (b), and (c) suggested below.

(a) Keywords including a morpheme having a largest number of occurrences among morphemes obtained through morpheme analysis (b) Keywords used to cause clicks of a predetermined number or more (c) Keywords having a predetermined length or greater Those conditions may be used to determine a keyword having reliability and including most sufficient information as the main keyword.

Table 1 shown below includes information on a document included in one data set and information on keywords used in selecting the document.

TABLE 1

| Data 1 | YoonJongGu | Putin's daughter | Admiral | |
| Data 2 | Admiral | YoonJongGu/ Admiral | Putin's daughter marriage | |
| Data 3 | Yekaterina, Putin's youngest daughter | Vladimir Putin | | |
| Data 4 | Putin's daughter | Putin's daughter marriage | Putin | Vladimir Putin |
| Data 5 | Putin's daughter marriage | Admiral | Putin's youngest daughter | |

Table 2 shows a number of occurrences of morphemes extracted through morpheme analysis with respect to the keywords in Table 1.

TABLE 2

| Putin | 10 times |
| daughter | 7 times |
| Navy, Admiral | 4 times |
| Marriage | 3 times |
| YoonJongGu, Vladimir, youngest | 2 times |
| Yekaterina | 1 time |

In this case, first of all, keywords including a morpheme 'Putin' which occurs most frequently may be candidates of the main keyword.

Table 3 below shows a length and a selection number of keywords that include the morpheme 'Putin.'

TABLE 3

| Keyword | Length | Number |
| --- | --- | --- |
| Putin's daughter | 7 | 4 |
| Putin's daughter marriage | 12 | 3 |
| Putin's youngest daughter | 11 | 1 |
| Yekaterina, Putin's youngest daughter | 22 | 1 |
| Vladimir Putin | 14 | 1 |
| Putin | 4 | 1 |

With respect to the candidate keywords, when the selection number is set to 2 or more, keywords 'Putin's daughter' and Putin's daughter marriage' still remain as the candidate keywords of the main keyword of the corresponding data set. The keyword 'Putin's daughter' occurring 4 times has a greater selection number than a 'Putin's daughter marriage' occurring 3 times. However, since the keyword 'Putin's daughter marriage' is longer than the keyword 'Putin's daughter', the keyword 'Putin's daughter marriage' may be selected as the main keyword of the corresponding data set. That is, the keyword 'Putin's daughter marriage' may be determined to be most explanatory, while still being representative.

The conditions may be varied as necessary. That is, the keyword ranking determining system according to the exemplary embodiments may determine the main keyword using at least one weight selected from a weight based on a morpheme-based redundant number calculated by analyzing morphemes of the keywords included in the at least one data set, a weight according to a selection number of the document caused by the corresponding keyword, and a weight according to a length of the keyword. Here, the weight based on the morpheme-based redundant number may be determined by whether a morpheme having a greatest redundant number is included.

Tables 4, 5, and 6 below show rankings of keywords each related to user groups 'single men', 'married men', and 'financial-tech tribe,' respectively. Although Tables 4, 5, and 6 show rankings up to a $12^{th}$ rank, a range of the rankings may be adjusted as necessary.

TABLE 4

| # | Keyword | Percentage |
|---|---------|------------|
| 1 | New Accent price | 11.76 |
| 2 | 30s female teacher | 11.49 |
| 3 | Camry Alpheon Altima | 3.53 |
| 4 | New Grandeur | 3.26 |
| 5 | Bigstar entertainment | 2.73 |
| 6 | Galaxy S froyo | 2.72 |
| 7 | Lacetti premiere diesel | 2.68 |
| 8 | Tosca succession | 2.63 |
| 9 | GwakHyeonhwa bowling | 2.60 |
| 10 | Hwagokdong middle school | 2.52 |
| 11 | Daecheon overcharging | 2.42 |
| 12 | YF sonata club | 2.39 |

TABLE 5

| # | Keyword | Percentage |
|---|---------|------------|
| 1 | 30s female teacher | 14.84 |
| 2 | KangHodong ChoYongpil | 2.70 |
| 3 | GwakHyeonhwa bowling | 2.52 |
| 4 | KangNam massage | 2.39 |
| 5 | Loan of money for lease house | 2.36 |
| 6 | Sweet potato storage | 2.33 |
| 7 | KB future payment high pass | 2.33 |
| 8 | Bigstar entertainment | 2.24 |
| 9 | Premium | 2.20 |
| 10 | Dongi OST | 2.15 |
| 11 | 3 main waterfalls of Seorak Mt. | 2.08 |
| 12 | i-phone 4 | 2.08 |

TABLE 6

| # | Keyword | Percentage |
|---|---------|------------|
| 1 | 30s female teacher | 18.49 |
| 2 | Samsung corporation | 5.64 |
| 3 | KDC | 5.16 |
| 4 | Hyundai IT | 3.52 |
| 5 | Hyundai motor stock price | 3.41 |
| 6 | Bigstar entertainment | 3.21 |
| 7 | OhJuran | 3.19 |
| 8 | stx offshore & shipbuilding | 3.06 |
| 9 | ENF technology | 3.00 |
| 10 | GwakHyeonhwa bowling | 2.58 |
| 11 | Daewoo engineering | 2.57 |
| 12 | Taegwang industry | 2.14 |

Figure 3:
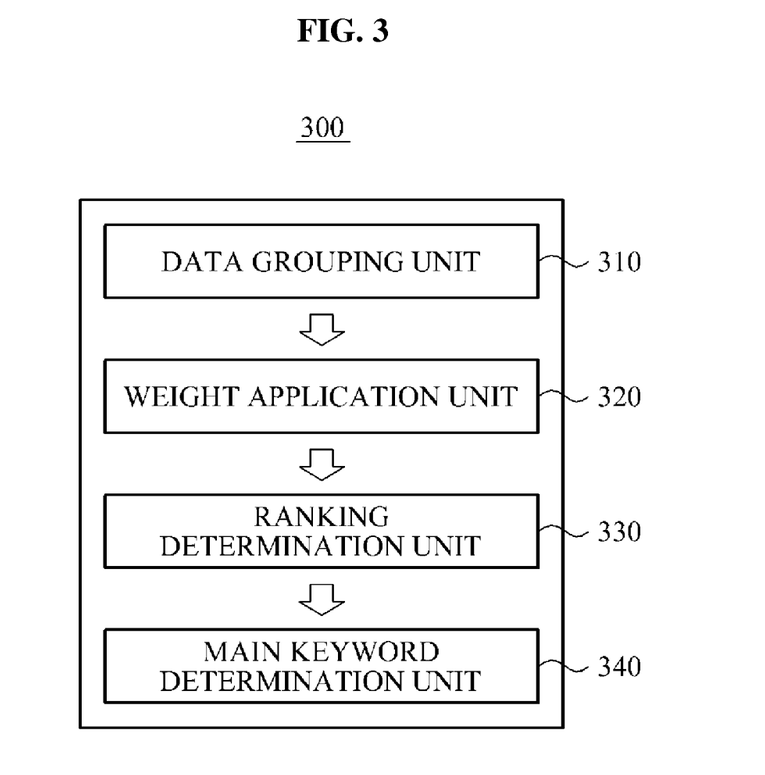
FIG. 3 is a block diagram illustrating an inner structure of a keyword ranking determining system according to an exemplary embodiment of the present invention.

FIG. 3 is a block diagram illustrating an inner structure of a keyword ranking determining system according to an exemplary embodiment of the present invention. As shown in FIG. 3, a keyword ranking determining system 300 may include a data grouping unit 310, a weight application unit 320, a ranking determination unit 330, and a main keyword determination unit 340.

The data grouping unit 310 may group data of a weblog according to a predetermined theme. The weblog may be the weblog 110 described in FIG. 1. The data of the weblog may include information on at least two of a document, a keyword used in selecting the document, and a selection number denoting a number of times the document is selected using the keyword. For example, the predetermined themes may be grouped according to the user group. The user groups may be determined by grouping users through a B-cookie. As aforementioned, the themes may be grouped not only by the user group but also by other references determined by an operator.

The weight application unit 320 may calculate a document concentration denoting a degree of concentration, with respect to the theme, of a document corresponding to the data grouped according to the theme. Also, the weight application unit 320 may apply a weight corresponding to the document concentration to the data. Keywords and documents of the grouped data may not represent characteristics of only the corresponding group. For example, a keyword "car" may be included in data grouped by a user group "single men" and also included in data grouped by a user group "married men." That is, through only the selection number, for example a number of clicks, generated using the corresponding keyword, it is hard to conclude that the keyword "car" represents characteristics of one particular user group. Also, through only a certain document A and the selection number generated with respect to the document A, it is difficult to conclude that the document A represents characteristics of one particular user group. Therefore, the keyword ranking determination system 300 may calculate the document concentration denoting the degree of concentration with respect to the theme of the document and apply a weight corresponding to the document concentration to the data, so that data including a document having a relatively high document concentration with respect to the theme may have a greater influence on calculation of the share afterward. Also, in other words, data including a document having a relatively low document concentration with respect to the theme may have a lower influence on calculation of the share.

For this purpose, the weight application unit 320 may calculate the document concentration of each document using a probability that the document corresponds to the theme and a probability that the document corresponds to all themes, and may adjust the selection number with respect to the document by applying the document concentration as the weight.

For example, presuming that 'd' denotes a document, 'T' denotes a set of all themes, 't' ($\epsilon$T) denotes each theme included in the set of themes, and '$P_d(t)$' denotes a probability that the document 'd' corresponds to the theme 't', a document concentration '$Q_d(t)$' of the document 'd' with respect to the theme 't' may be calculated by Equation 1 described in the foregoing.

Presuming that '$C_{d,t\text{-}naive}$' denotes a selection number, for example a number of clicks, occurring with respect to the document 'd' in the theme 't', a finally adjusted selection number '$C_{d,t\text{-}weighted}$' may be calculated by Equation 2 described in the foregoing.

The ranking determination unit 330 may generate at least one data set by grouping the data to which the weight is applied according to a search intention, and determine rankings of the at least one data set according to the theme.

Here, the data having the same 'search intention' may be grouped as one data set and, for this purpose, principles (1) and (2) may be defined as follows.

(1) When clicked documents are the same document, it is determined that the search intention is the same although different keywords are used.

(2) Although clicked documents are different, it is determined that the search intention is the same when the same or similar keywords are used.

Using the above-mentioned principles, the ranking determination unit 330 may generate the data set, by grouping the data including information on the same document as the same search intention and by grouping the data including keywords among which similarity is greater than or equal to a predetermined value as the same search intention. According to other exemplary embodiments, the ranking determination unit 330 may cluster documents using similarity among keywords used in selecting the corresponding document and thereby generate the at least one data set each including the same document.

After the at least one data set is thus generated by grouping data having the same search intention as one data set, a size of the at least one data set may be calculated using a sum of the selection number adjusted with respect to the data included in the data set. In addition, the share may be calculated as ratio of size of the at least one data set. That is, the ranking determination unit 330 may calculate the share of each data set included in the theme, using the selection number adjusted according to the document, and determine rankings of the at least one data set in the theme. The share may show shares of clicks generated in each user group by each search intention. Presuming that 'N(c)' denotes a sum of the selection numbers in a data set 'c' (E C) with respect to an entire data set 'C', a share 'P(c)' of the data set 'c' may be calculated using Equation 3 described in the foregoing.

The main keyword determining unit 340 may determine a main keyword representing each data set. To be specific, each data set includes a plurality of data. Accordingly, each data set may include various keywords having the same search intention. Therefore, the main keyword determination unit 340 may determine a keyword most properly representing each data set as the main keyword.

For example, the main keyword determination unit 340 may determine the main keyword using the foregoing conditions (a), (b), and (c). These conditions may be used to determine a keyword having reliability and including most sufficient information, as the main keyword.

These conditions may be varied as necessary. In this respect, the main keyword determination unit 340 of the keyword ranking determining system according to the exemplary embodiments may determine the main keyword using at least one weight selected from a weight based on a morpheme-based redundant number calculated by analyzing morphemes of the keywords included in the at least one data set, a weight according to a selection number of the document caused by the corresponding keyword, and a weight according to a length of the keyword. Here, the weight based on the morpheme-based redundant number may be determined by whether a morpheme having a greatest redundant number is included.

Figure 4:
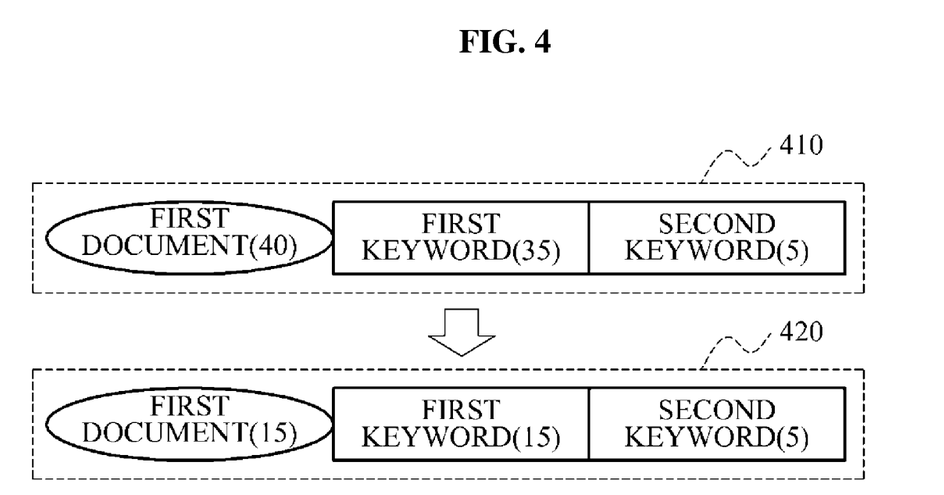
FIG. 4 is a diagram illustrating an example of adjusting a selection number with respect to a document, according to an exemplary embodiment of the present invention.

FIG. 4 is a diagram illustrating an example of adjusting a selection number with respect to a document, according to an exemplary embodiment of the present invention. A first dotted-line box 410 shows that the selection number '40', for example a number of clicks, with respect to a first document includes 35 times generated through a first keyword and 5 times generated through a second keyword. A second dotted-line box 420 shows that the selection is number with respect to the first document may be adjusted using Equations 1 and 2 described in the foregoing. Here, the selection number with respect to the first document is adjusted from '40' to '15.' In this case, the selection number '35' with respect to the first keyword, which exceeds the selection number '15' with respect to the first document, is adjusted from '35' to '15.' That is, when the selection number with respect to a document is changed, the number of selections with respect to a keyword, which is greater than the changed selection number, may be also changed to the changed selection number. The number of selection with respect to the document may be used in calculation of the share. When selecting a main keyword, the number of selection per keyword may be used.

Thus, the system and method according to the exemplary embodiments may provide keyword ranking according to a user group using user clustering information, thereby providing new information and inducing new query count. Also, keywords having the same search intention are displayed as one data set, and a search share and a main keyword of the data set are provided by calculating the search share and determining ranking. Accordingly, new information may be provided and interest may be attracted from users.

The methods according to the above-described exemplary embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the exemplary embodiments, or they may be of the kind well-known and available to those having skill in the computer software arts. In addition, the above-described file system may be recorded in computer-readable media.

Although exemplary embodiments have been shown and described, it would be appreciated by those skilled in the art that changes may be made in these exemplary embodiments without departing from the principles and spirit of the disclosure, the scope of which is defined in the claims and their equivalents.

What is claimed is:

1. A keyword ranking determining system including a computer and a data storage device coupled to the computer, the system comprising using the computer to perform:
grouping data of a weblog according to a theme in a predefined set of themes, the theme being one of user groups included in the weblog, and the user groups being groups of users who selected a document using a keyword, wherein the document is a website, wherein the keyword is one entered by a user leading to selection of the document and included in the data of the weblog;
storing the data of the weblog, the data of the weblog including information on the document, the keyword used in selecting the document, the user that entered the keyword used in selecting the document, and a selection number indicating a number of times the document is selected using the keyword;
calculating a document concentration of the document corresponding to the theme using a relationship between a probability that the document corresponds to the theme and a probability that the document corresponds to all themes in the predefined set of themes, and to apply a weight corresponding to the document concentration to the data of the weblog to adjust the selection number with respect to the document;

generating at least one data set by grouping the data of the weblog applied with the weight according to a search intention, wherein determining the search intention involves grouping keywords used to select a same document as the same search intention, and/or by grouping keywords among which similarity is greater than or equal to a value as the same search intention, and determining rankings of the at least one data set according to the theme, thereby ranking the keywords in the at least one data set according to an associated user group, and further calculating a share of a data set included in the theme using the selection number adjusted according to the document and to determine rankings of the at least one data set with respect to the theme according to the calculated share; and determining a main keyword representing each of the at least one data set from each of the at least one data set as generated and ranked;

wherein the system further provides a set of ranked keywords for each of said user groups.

2. The keyword ranking determining system of claim 1, wherein the share is calculated using a sum of the selection numbers in the data set included in the theme and a sum of all selection numbers with respect to all of the at least one data set.

3. The keyword ranking determining system of claim 1, further comprising clustering documents using similarity among keywords used in selecting the corresponding document and thereby generate the at least one data set each including the selected corresponding document.

4. The keyword ranking determining system of claim 1, further comprising determining the main keyword among a plurality of keywords, using at least one weight selected from a weight based on a morpheme-based redundant number calculated by analyzing morphemes of the keywords included in the at least one data set, a weight according to a selection number of the document caused by the corresponding keyword, and a weight according to a length of the keyword.

5. The keyword ranking determining system of claim 4, wherein the weight based on the morpheme-based redundant number is determined by whether a morpheme having a greatest redundant number is included.

6. The keyword ranking determining system of claim 1, wherein the user group is identified based on a (browser cookie) B-cookie.

7. A keyword ranking determining method, comprising:
using a computing device to perform the following:
grouping data of a weblog according to a theme in a predefined set of themes, the theme being one of user groups included in the weblog, and the user groups being groups of users who selected a document using a keyword, wherein the document is a website, wherein the keyword is one entered by a user leading to selection of the document and included in the data of the weblog;

storing the data of the weblog in a storage medium, the data of the weblog including information on the document, the keyword used in selecting the document, the user that entered the keyword used in selecting the document, and a selection number indicating a number of times the document is selected using the keyword;

calculating a document concentration of the document corresponding to the theme using a relationship between a probability that the document corresponds to the theme and a probability that the document corresponds to all themes in the predefined set of themes, and applying a weight corresponding to the document concentration to the data of the weblog to adjust the selection number with respect to the document;

generating at least one data set by grouping the data of the weblog applied with the weight according to a search intention, wherein determining the search intention involves grouping keywords used to select a same document as the same search intention, and/or by grouping keywords among which similarity is greater than or equal to a value as the same search intention, and determining rankings of the at least one data set according to the theme, thereby ranking the keywords in the at least one data set according to an associated user group, wherein the determining of rankings of the at least one data set comprises calculating a share of each of the at least one data set included in the theme using the selection number adjusted according to the weight, and determining rankings of the at least one data set with respect to the theme according to the calculated share;

determining a main keyword representing each of the at least one data set from each of the at least one data set generated and ranked; and providing a set of ranked keywords for each of said user groups.

8. The keyword ranking determining method of claim 7, wherein the share is calculated using a sum of the selection numbers in each data set and a sum of all selection numbers with respect to all of the at least one data set.

9. The keyword ranking determining method of claim 7, wherein
the determining of the rankings of the at least one data set clusters documents using similarity among keywords used in selecting the corresponding document and thereby generates the at least one data set each including the selected corresponding document.

10. The keyword ranking determining method of claim 7, wherein the determining of the main keyword representing each of the at least one data set comprises:
determining the main keyword among a plurality of keywords, using at least one weight selected from a weight based on a morpheme-based redundant number calculated by analyzing morphemes of the keywords included in the at least one data set, a weight according to a selection number of the document caused by the corresponding keyword, and a weight according to a length of the keyword.

11. The keyword ranking determining method of claim 10, wherein the weight based on the morpheme-based redundant number is determined according to whether a morpheme having a greatest redundant number is included.

12. The keyword ranking determining method of claim 7, wherein the user group is identified based on a (browser cookie) B-cookie.

13. A non-transitory computer-readable recording medium storing a program to cause a computer to implement a method comprising:
grouping data of a weblog according to a theme in a predefined set of themes, the theme being one of user groups included in the weblog, and the user groups being groups of users who selected a document using a keyword, wherein the document is a website, wherein the keyword is one entered by a user leading to selection of the document and included in the data of the weblog;

storing the data of the weblog in a storage medium, the data of the weblog including information on the document, the keyword used in selecting the document, the user that entered the keyword used in selecting the document, and a selection number indicating a number of times the document is selected using the keyword;

calculating a document concentration of the document corresponding to the theme using a relationship between a probability that the document corresponds to the theme and a probability that the document corresponds to all themes in the predefined set of themes, and applying a weight corresponding to the document concentration to the data of the weblog to adjust the selection number with respect to the document;

generating at least one data set by grouping the data of the weblog applied with the weight according to a search intention, wherein determining the search intention involves grouping keywords used to select a same document as the same search intention, and/or by grouping keywords among which similarity is greater than or equal to a value as the same search intention, and determining rankings of the at least one data set according to the theme, thereby ranking the keywords in the at least one data set according to an associated user group, wherein the determining of rankings of the at least one data set comprises calculating a share of each of the at least one data set included in the theme using the selection number adjusted according to the weight, and determining rankings of the at least one data set with respect to the theme according to the calculated share;

determining a main keyword representing each of the at least one data set from each of the at least one data set generated and ranked; and providing a set of ranked keywords for each of said user groups.

\* \* \* \* \*